United States Patent [19]

Chapa, Sr.

[11] 4,181,073

[45] Jan. 1, 1980

[54] CHALUPA FRYING UTENSIL

[76] Inventor: Abel A. Chapa, Sr., 605 Brock, Corpus Christi, Tex. 78412

[21] Appl. No.: 877,662

[22] Filed: Feb. 14, 1978

[51] Int. Cl.² ............................................. A47J 37/12
[52] U.S. Cl. ........................................ 99/416; 99/426
[58] Field of Search ................. 99/402, 416, 426, 448, 99/450, 403; 100/116, 234; 224/45 F, 45 G, 45 K; 354/340, 345, 346

[56] References Cited

U.S. PATENT DOCUMENTS

| 709,048 | 9/1902 | Sausser | 99/450 |
|---|---|---|---|
| 883,432 | 3/1908 | Traeger | 99/402 X |
| 1,195,370 | 8/1916 | Larsen | 100/116 |
| 1,470,521 | 10/1923 | Combest | 99/450 |
| 2,216,984 | 10/1940 | Pearson | 99/426 UX |
| 2,814,981 | 12/1957 | Wendel | 99/426 |
| 3,207,059 | 9/1965 | Hirons | 99/416 X |

*Primary Examiner*—Daniel Blum
*Attorney, Agent, or Firm*—G. Turner Moller

[57] ABSTRACT

There is disclosed a chalupa frying utensil usable in conjunction with either deep fat fryers, deep sauce pans, or relatively flat skillets. The utensil comprises a multiplicity of thin perforate sheet metal plates connected together for opening and closing movement upon manipulation of a pair of handle sections connected to the outermost plates. Means are provided to secure the handle sections together. The perforate plates are selected to prevent sticking of the chalupas to the plates.

7 Claims, 4 Drawing Figures

CHALUPA FRYING UTENSIL

This invention relates to a utensil for frying tortillas and producing a flat crisp product known as a chalupa shell.

Chalupa shells are traditionally produced from tortillas by floating the tortilla in the hot oil bath of a deep fat fryer. Traditionally produced chalupas shells typically include large bubbles caused by partial delamination of the tortilla during frying.

Because of these bubbles and because traditional tortilla frying techniques require large deep fat frying utensils per unit output, several implements of different type have been proposed and/or used in the production of chalupa shells. First, a large device similar to a ferris wheel has been commercially used. The wheel provides a multiplicity of tortilla holding stations. Rotation of the wheel causes the various stations to be submerged in a bath of hot cooking oil. Second, a small hand held device has been commercially used comprising a multiplicity of leaves for holding a multiplicity of tortillas therebetween. Each leaf is comprised of a number of parallel wires which purport to separate each tortillas from each adjacent tortilla.

Also of interest is the disclosure in U.S. Pat. No. 3,207,059 which discloses a wire mesh utensil comprising a plurality of leaves for receiving bacon strips or other thin pieces of meat therebetween for simultaneously cooking a large number of items. Upon investigation, it has been found that such devices are inapplicable for preparing chalupa shells because the frying tortilla adhers to the wire mesh leaves and to adjacent tortillas.

Also of interest is the disclosure in U.S. Pat. No. 3,537,389 which illustrates a utensil for frying taco shells.

In summary, this invention comprises a device for simultaneously producing a plurality of chalupa shells comprising flat perforate metal sheet sections interposed between tortillas to be fried. The end sections include handles and means for temporarily latching the handles together for handling the utensil and food products as a unit.

IN THE DRAWING

Figures 1, 2, 3:
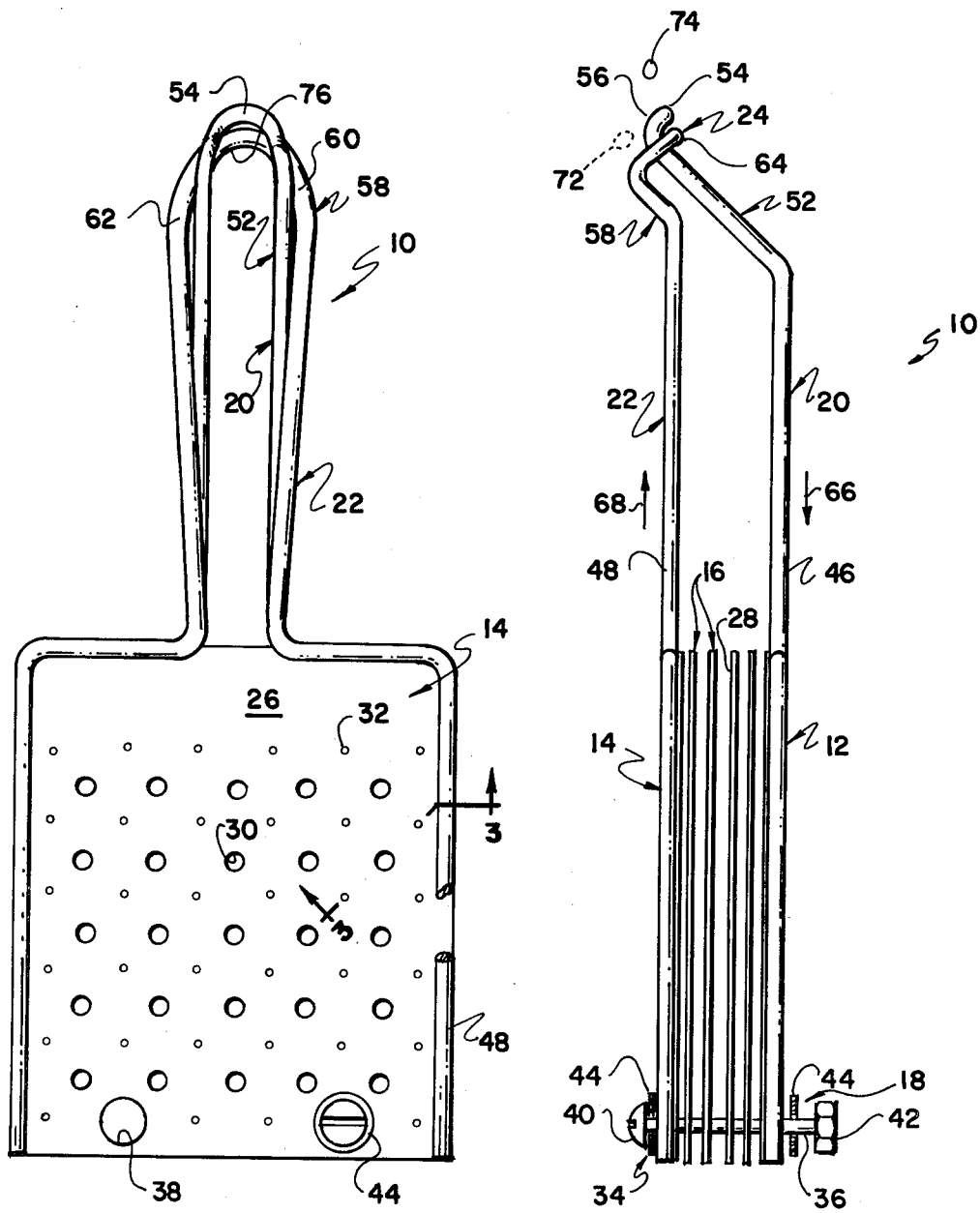
FIG. 1 is a top view of a utensil in accordance with the principals of this invention.
FIG. 2 is a side view of the utensil of FIG. 1, illustrating the same in a closed or operative position.
FIG. 3 is an enlarged cross-sectional view of the utensil of FIG. 1 taken substantially along line 3—3 thereof as viewed in the direction indicated by the arrows.

Referring to FIGS. 1 and 2, a utensil 10 of this invention comprises a base plate 12, a cover plate 14, a plurality of intermediate plates 16, means 18 interconnecting the plates 12, 14, 16 and mounting the same for opening and closing movement, a pair of handle sections 20, 22 respectively connected to the plates 12, 14 and means 24 for temporarily latching the handle sections 20, 22 together in the closed or operative position of FIG. 2.

Each of the plates 12, 14 and the plate 16 comprises a flat section 26, 28 respectively of perforated metal sheet, such as aluminum or stainless steel, having a plurality of openings 30 therein constituting a minor portion of the area of each section 26, 28. In addition, each section 26, 28 may be provided with a multiplicity of spaced dimples 32 scattered throughout the operative tortilla engaging surface of the sections 26, 28. The openings 30 and dimples 32 are conveniently regularly spaced on the sections 26, 28. The sections 26 comprising part of the base plate 12 and cover plate 14 are conveniently somewhat thicker than the sections 28 comprising the intermediate plates 16.

Because the sections 26, 28 are flat metal pieces, tortillas being fried in contact therewith do not stick thereto for reasons not fully understood. Even though the dimples 32 slightly change the flatness of the sections 26, 28 this does not cause adhesion of the tortillas to the sections 26, 28 for reasons which are not altogether understood. The purpose of the dimples 32 is, somewhat surprisingly, to further assure against sticking of the tortillas to the sections 26, 28 and to allow circulation of cooking oil during frying.

The relative size of the openings 30 appears to have some effect on the tendencies for tortillas to stick thereto. When the size of each individual opening 30 increases, there is a tendency for the tortilla to delaminate and extend through the opening. As the tortilla extends through the opening, it tends to expand to form a rivet shaped head thereby captivating the tortilla to the metal plate. The size of the openings 30 is accordingly selected to obviate this difficulty. There is some evidence that as the openings 30 exceed one-half inch in diameter or 0.196 square inches, the tortillas tend to become captivated to the metal sections. If, on the other hand, the openings are too small, there is insufficient oil circulation through the metal sections, cooking of the chalupa in uneven. A lower limit of opening size appears to be about one-eight inch diameter. A one-fourth inch diameter opening spaced on one inch centers has proved very satisfactory.

The interconnecting means 18 may be of any suitable type and conveniently comprises a pair of bolts 34 having a shank 36 extending through a mounting opening 38 in each of the juxtaposed plates 12, 14, 16 and disposing a bolt head 40 on one side of the utensil 10 while a nut 42 is threaded onto the shank 36 on the opposite side of the utensil 10. One or more washers 44 may be provided on the bolt shank 36 to minimize wear around the openings 38. As is apparent from a comparison of FIGS. 1 and 2, the shank 36 is substantially smaller than the opening 38 for purposes more fully explained hereinafter.

The handle sections 20, 22 conveniently comprise an elongate metallic rod 46, 48 bent to conform to the periphery of the plates 26 and is secured thereto in any suitable fashion, as by the provision of weldments 50. It will accordingly be apparent that the sections 26 are strengthened by the provision of the rods 46, 48 around the periphery of the plates 12, 14.

The latching mechanism 24 is desirably inexpensive and capable of being readily manipulated to secure the handle sections 20, 22 together so that the utensil 10 along with any tortillas or chalupa shells loaded therein become a unit handled piece. To this end, the handle section 20 forms a narrow loop 52 inclined to the plane of the plates 12, 14 having an end 54 bent substantially perpendicularly to the loop 52 and providing a reentrant surface 56 for receiving a wider loop 58 provided by the handle section 22. As best illustrated in FIG. 1, the loop 58 comprises legs 60, 62 spaced apart sufficiently to receive the end 54 of the handle section 20. In addition, the legs 60, 62 are bent to provide an end 64 engagable with the reentrant surface 56. As will become more fully apparent hereinafter, the latching mechanism 24 is operative because the plates 12, 14 are supported by the interconnecting means 18 for movement in opposite directions in planes parallel to the plates 12, 14 as suggested by the arrows 66, 68. In addition, loading of tortillas in the utensil 10 biases the base and cover plates 12, 14 against the bolt head 40 and nut 42 in order to spring load the latch mechanism 24. In order to unlatch the utensil 10 from the closed configuration illustrated in FIG. 2, the handle 20 is moved in a generally counterclockwise direction to free the end 64 from the reentrant surface 56 of the loop 52. After the loop 52 clears the end 64, the handles 20, 22 are moved in relatively opposite directions in accordance with the arrows 66, 68. Accordingly, the end 54 clears the end 64 thereby freeing the mechanical interference between the handle sections 20, 22 and allowing the utensil 10 to move into the open configuration illustrated in FIG. 4.

Figure 4:
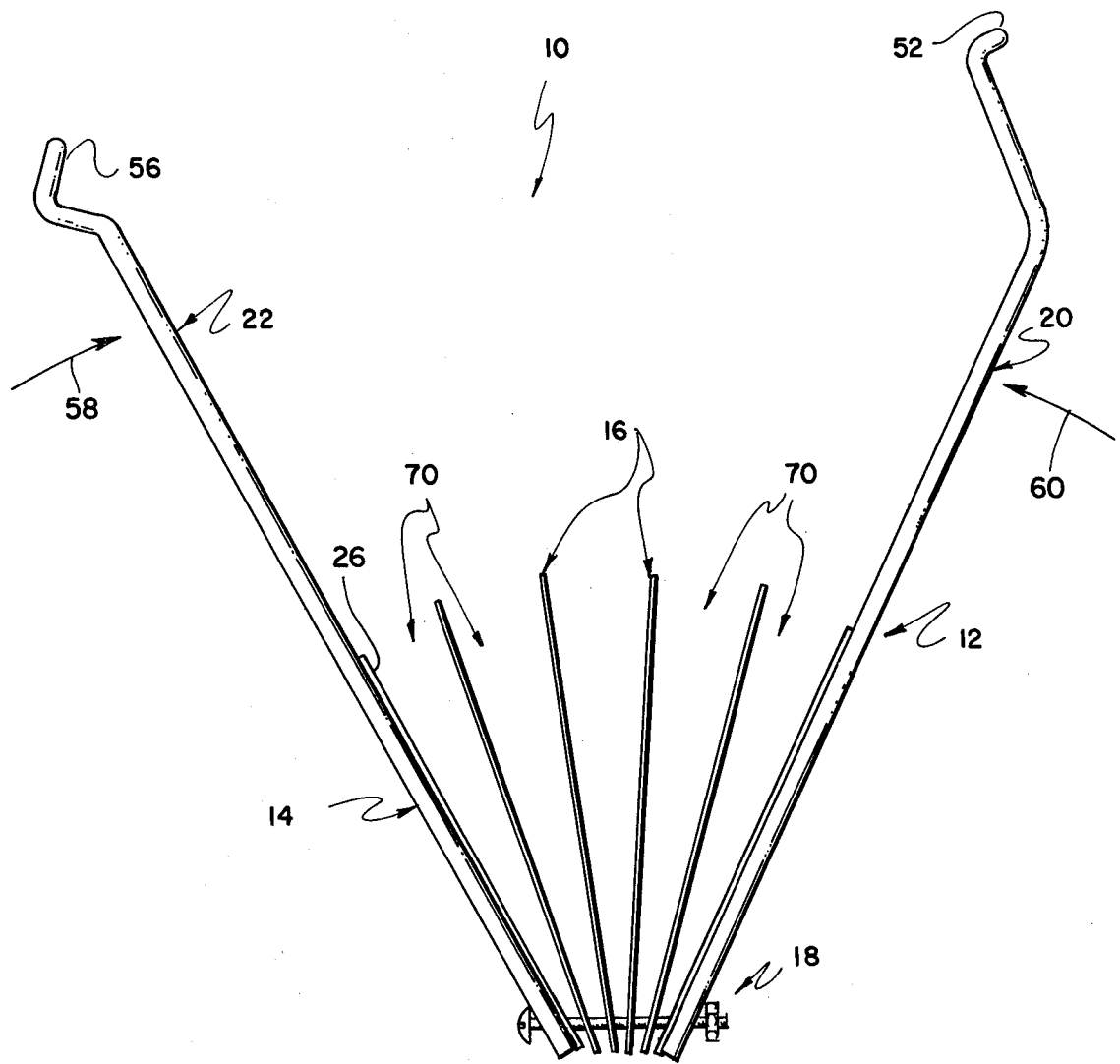
FIG. 4 is a side view of the utensil of FIGS. 1 and 2 illustrating the same in an open position adapted to receive unfried tortillas or enabling the removal of finished chalupa shells.

In use, the utensil 10 is opened to the position shown in FIG. 4 and tortillas are loaded into the areas 70 between adjacent intermediate plates 16 and between the intermediate plates 16 and the base and cover plates 12, 14 respectively. The handle sections 20, 22 are then closed as allowed by the mounting means 18 to juxtapose the loops 52, 56 of the handle sections 20, 22. The handle sections 20, 22 are then moved in the direction shown by the arrows 58, 60 and pivoted to place the end 64 at a location 72 illustrated in FIG. 2. The handle sections 20, 22 are then moved in the direction shown by the arrows 66, 68 while pivoting the handle sections 20, 22 to place the end 64 at a location 74. The handle sections 20, 22 are then moved in a direction opposite from that shown by the arrows 66, 68 to engage the end 64 with the reentrant surface 54. Because the tortillas loaded in the utensil 10 bias the plates 12, 14 against the bolt head 40 and nut 42, the handle sections 20, 22 are biased apart thereby spring loading the latch mechanism 24 and allowing the utensil 10 to be unit handled.

The loaded utensil 10 is then immersed in a hot cooking oil provided by a deep fat fryer or skillet and the tortillas cooked until oil bubbling ceases. Because of the open curved surface 76 provided by the loop 58, the utensil 10 can be hung vertically in a deep fat fryer thereby substantially minimizing the volume occupied in the fryer. Accordingly, for a given sized fryer, a large number of utensils 10 can be employed concurrently thereby substantially increasing output.

When the loaded tortillas are cooked, the utensil 10 is removed from the cooking oil and allowed to drain. The finished chalupa shells may then be removed from the utensil 10 merely by unlocking the latch mechanism 24, positioning the utensil 10 so that the bolt shank 36 is horizontal and opening the plates 12, 14 to allow the chalupa shells to fall out.

Although the invention has been described and illustrated in reference to a preferred embodiment of the invention, it will be understood that changes in form, cooperation of parts and the like may be made by those skilled in the art without departing from the scope and spirit of the following claims.

I claim:

1. A chalupa frying utensil comprising:

a cover plate, a base plate and at least one intermediate plate, the plates being superposed and of flat metal sheet and means aiding in preventing a frying tortilla from sticking to the plates comprising a multiplicity of openings in each of the plates, the openings being of arcuate shape having a maximum dimension in the approximate range of ⅛-178 inch and constituting a minor portion of the area of each plate;

means interconnecting the plates on one end thereof allowing the cover and base plate to move apart and allowing the intermediate plate to move toward and away from the cover and base plates upon opening movement of the cover and base plates;

handle sections connected to the cover and base plates respectively and extending in a common direction away from the other end of the plates for imparting opening and closing movement to the plates; and means for releasably latching the handle sections together.

2. The utensil of claim 1 wherein the plates are of aluminum and the openings therein are generally circular.

3. The utensil of claim 1 wherein the plates are generally planar and comprise a multiplicity of dimples extending out of the plane of the sheets.

4. The utensil of claim 1 wherein the plates comprise dimples between at least some of the openings.

5. The utensil of claim 1 wherein the cover and base plates are substantially thicker than the intermediate plate.

6. A chalupa frying utensil comprising:

a cover plate, a base plate and at least one intermediate plate, the plates being superposed and of flat perforate metal sheet in which the openings thereof constitute a minor portion of the area of each plate;

handle sections connected to the cover and base plates respectively and extending in a common direction away from one end of the plates;

means interconnecting the plates at the other end thereof allowing the cover and base plates to move apart, allowing the intermediate plate to move toward and away from the cover and base plates upon opening movement of the cover and base plates, and allowing movement of a first handle section in a path generally parallel to the other handle section; and means for releasably latching the handle section together comprising portions on the handle sections configured to interlock and preclude plate opening movement;

the handle sections and interconnecting means being arranged to allow movement of the first handle portion sequentially from a first position laterally adjacent but free of the other handle portion through a second position spaced from the other handle portion and closing movement from the second position to a third position in which the handle section portions are interlocked.

7. The utensil of claim 6 one of the handle sections comprises a loop having an end and spaced apart legs and the other handle section comprises a portion extending between the spaced legs and having and end, the handle ends comprising the interlocked handle portions.

* * * * *